Patented Dec. 15, 1953

2,662,919

UNITED STATES PATENT OFFICE 2,662,919

HYDROLYSIS OF ALKENYL ALKYL ETHERS IN THE VAPOR PHASE

Hugh J. Hagemeyer, Jr., Kingsport, Tenn., and Dan C. Anderson, Charlotte, N. C., assignors to Eastman Kodak Company, Rochester, N. Y., a corporation of New Jersey No Drawing. Application May 13, 1950, Serial No. 161,896

13 Claims. (Cl. 260—593)

This invention relates to a new process for hydrolyzing alkenyl alkyl ethers in the vapor phase. More particularly, this invention relates to a new process for hydrolyzing alkenyl alkyl ethers, wherein the alkenyl group contains unsaturation in the $\alpha,\beta$-position, in the vapor phase.

It is known that alkyl vinyl ethers can be hydrolyzed to acetaldehyde and an alkyl alcohol in the presence of mineral acids, e. g. sulfuric acid (British Patent 496,840, accepted December 7, 1938). The catalyst is generally employed in the form of aqueous solutions, although the catalyst can be incorporated on an inert carrier, and the alkyl vinyl ether passed over the catalyst in the form of a gas. The amount of hydrolysis occurring when these acid catalysts are employed is not appreciably high, and a quantity of the ether is either recovered unreacted, or has entered into side reactions.

We have now found that alkenyl alkyl ethers can be hydrolyzed in the vapor phase in the presence of certain non-acidic catalysts to give aldehydes or ketones in high yields.

It is, therefore, an object of our invention to provide a new process for hydrolyzing alkenyl alkyl ethers. A further object is to provide a process for hydrolyzing alkenyl alkyl ethers to give higher yields of aldehydes or ketones than those heretofore obtainable. Other objects will become apparent from a consideration of the following description and examples.

According to our invention we hydrolyze alkenyl alkyl ethers in the vapor phase in the presence of certain non-acidic catalysts.

Catalysts which can advantageously be used in our invention comprise aluminum silicate and silver oxide, or mixtures comprising them.

The alkenyl alkyl ethers useful in practicing our invention comprise those represented by the following general formula:

I.  $\quad R\!-\!O\!-\!\underset{\underset{R_1}{|}}{C}\!=\!\underset{\underset{R_3}{|}}{C}\!-\!R_2$ wherein R represents an alkyl group, such as methyl, ethyl, n-propyl, isopropyl, n-butyl, isobutyl, etc. groups (e. g. an alkyl group of the formula $C_nH_{2n+1}$ wherein $n$ represents a positive integer of from 1 to 4) and $R_1$, $R_2$, and $R_3$ each represents a hydrogen atom or an alkyl group, such as methyl, ethyl, etc. (e. g. an alkyl group containing from 1 to 2 carbon atoms). Alkenyl alkyl ethers wherein $R_1$ and $R_2$ represents a hydrogen atom and $R_3$ represents a hydrogen atom or a methyl group have been found to be especially useful. Typical alkenyl alkyl ethers which can be used include methyl vinyl ether, ethyl vinyl ether, n-propyl vinyl ether, isopropyl vinyl ether, n-butyl vinyl ether, isobutyl vinyl ether, isopropenyl methyl ether, ethyl isopropenyl ether, ethyl propenyl ether, ethyl 2-methylpropenyl ether, ethyl 2-ethylpropenyl ether, ethyl 2,2-dimethylpropenyl ether, methyl 2-methylpropenyl ether, etc. Ethers wherein $R_2$ or $R_3$ represents a halogen atom (e. g. a chlorine atom) can also be used in the process, although usually less advantageously.

The process of our invention can be represented schematically according to the following equations

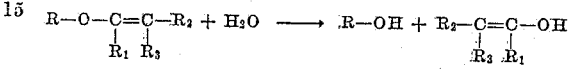

When $R_1$ represents a hydrogen atom, an aldehyde forms by enolic rearrangement, thus

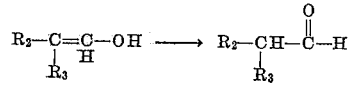

When $R_1$ represents an alkyl group, a ketone forms according to the equation:

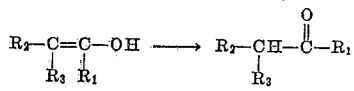

The hydrolysis is advantageously carried out by passing vapors of the alkenyl alkyl ether mixed with steam over the non-acidic catalyst. The temperature at which the hydrolysis is carried out can be varied, however, temperatures above 400° C. generally should not be employed, since considerable charring or pyrolysis may occur. Temperatures varying from 150°–400° C. have been found to be most satisfactory in our new process. The vapors of the alkenyl alkyl ether can be preheated to the reaction temperature before passing over the catalyst, or the liquid alkenyl alkyl ether can be distilled from a suitable receptacle, and the vapors passed over the catalyst bed, which can be supplied with external heating means at one end to induce the reaction. Once hydrolysis has begun considerable heat is generated due to the highly exothermic nature of the reaction and steps must be taken to dissipate the excess heat. The temperature above the catalytic mass can advantageously be stabilized by employing an amount of steam in excess of that required by hydrolysis, or by supplying the reaction vessel with cooling means, e. g. a heat interchanger to preheat the gaseous ether passing into the reaction chamber, or a liquid refrigerant, such as brine, etc. Excess steam serves as an excellent diluent, since the reaction temperature can be accurately controlled by regulating the amount of ether and steam entering the reaction chamber during a given period.

The time of contact of the alkenyl alkyl ether with the catalyst varies and is a function of the particular catalyst employed, the amount of catalyst present and length of the catalyst bed, the temperature of the reaction chamber, the amount of steam present, the ease of hydrolysis of the particular ether, etc. For most purposes, contact times of from 0.01 to 0.50 seconds are satisfactory, however, this range does not represent the limits of our process which is susceptible to variation as discussed above.

The following examples illustrate representative methods of preparing certain of the catalysts which can be used in our invention. They are merely representative and do not necessarily represent the most expeditious methods of obtaining these catalysts, which are well known inorganic substances.

Example A.—Aluminum silicate 482 g. (2 mol.) of aluminum chloride hexahydrate were dissolved with stirring in one liter of water. To the solution, 600 g. of water glass (approximately 3 mol. of sodium silicate) were added with stirring, whereupon a precipitate of aluminum silicate formed immediately. It was filtered off, washed thoroughly by decantation, and then dried at 140°–180° C. Particles smaller than 4–6 mesh were screened out, and the remaining larger particles used to pack the reaction vessel.

little or no decomposition occurs in our process up to temperatures of about 400° C. This is apparently due to the presence of steam, and in some instances, some interaction between the silver oxide and its carrier; e. g. silica. When silica is used there is some evidence that at least a part of the silver oxide interacts with the silica to form silver silicate, or with alumina to form aluminates. Wet steam, i. e. steam containing large amounts of liquid water, can be advantageously used to stabilize the silver oxide and to effect rapid hydrolysis of the ether.

The following examples illustrate further the manner whereby we practice the process of our invention.

Example 1.—Ethyl vinyl ether hydrolysis 100 g. of ethyl vinyl ether were vaporized in a preheater tube, and after mixing with 800 g. of steam, passed over a bed of aluminum silicate, deposited in a hydrolysis tube measuring one inch in inside diameter and 14 inches in length, at a temperature of 300° C. The contact time was 0.05 second. The gaseous products were condensed, and on distillation, 50 per cent of the ethyl vinyl ether was found to be converted to hydrolysis products and the remainder was recovered unreacted. On fractionation 35 g. of acetaldehyde representing a 96 per cent yield and 33.4 g. of ethanol representing a 96.5 per cent yield (based on the weight of ether hydrolyzed) were recovered.

Several alkyl vinyl ethers were each passed over a catalyst according to the method described in Example 1 above. The particular catalyst used, amount of catalyst, etc. are given in the table below.

TABLE

| Ex. | Alkyl Vinyl Ether | Grams Ether | Steam, Grams | Catalyst | Contact Time, Seconds | Temp., °C. | Conversion, Percent [a] | Yield, Percent [b] |
|---|---|---|---|---|---|---|---|---|
| 2 | Methyl | 100 | 200 | Aluminum Silicate | 0.18 | 300 | 64 | 79 |
| 3 | do | 100 | 600 | do | 0.10 | 300 | 50 | 91 |
| 4 | Ethyl | 100 | 300 | do | 0.05 | 300 | 60 | 96.3 |
| 5 | do | 100 | 600 | 10% Silver Oxide on Silica Gel | 0.10 | 250 | 75 | 100 |
| 6 | n-Butyl | 100 | 250 | Aluminum Silicate | 0.15 | 300 | 62 | 85 |
| 7 | Methyl | 100 | 450 | Pyrex Rings | 0.12 | 300 | 0 | 0 |
| 8 | Ethyl | 100 | 200 | do | 0.18 | 300 | 0 | 0 |
| 9 | do | 100 | 500 | Silica Gel | 0.09 | 300 | 15 | [c] 54 |

[a] Percentage of alkyl vinyl ether undergoing reaction.
[b] Percentage of converted products recovered as hydrolyzed fraction (represents amount of acetaldehyde and alcohol obtained).
[c] Approximately 8% of ether isomerized to n-butyraldehyde.

Example B.—Silver oxide on alumina 29 g. of silver nitrate were dissolved in one liter of water, and 200 g. of alumina (4–6 mesh) were allowed to soak in this solution for four hours. A 10 per cent solution of sodium hydroxide was then added to precipitate the silver oxide. The precipitated silver oxide was then washed with water and dried at 200° C. for six hours. The silver oxide constituted 10.3 per cent by weight of the catalyst.

In place of alumina, other carriers, such as silica gel, Alundum (95–99 per cent alumina), kieselguhr, etc. can be used in preparing the catalysts useful in practicing our invention. The amount of silver oxide deposited on the carrier can be varied, depending on the carrier employed, reaction conditions, etc. Generally from 5 to 30 per cent by weight of the total mass comprises silver oxide. While silver oxide ordinarily decomposes at about 250° C., we have found that

Example 10.—Ethyl isopropenyl ether hydrolysis 100 g. of ethyl isopropenyl ether were vaporized in a preheater tube, and after mixing with 800 g. of steam, passed through a hydrolysis tube, such as that described in Example 1, which had been packed with one-eight inch catalyst pellets containing 10 per cent silver oxide on Alundum (e. g. Riegel—"Industrial Chemistry," 1940 (Reinhold), page 296). The contact time was 0.15–0.19 of a second and the temperature was maintained at 230–250° C. The off-gases were condensed, and on distillation it was found that 63 per cent of the ether had been converted to hydrolysis products, with a 97 per cent recovery of unchanged ether. On the basis of the above conversion, 93 per cent of the theoretical amount of acetone and 97 per cent of the theoretical amount of ethanol were recovered.

*Example 11.—Ethyl 1-ethylvinyl ether hydrolysis*

100 g. of ethyl 1-ethylvinyl ether were vaporized in a preheater, and after mixing with 600 g. of steam, passed through a hydrolysis tube, which was packed with silica gel having deposited thereon 8.7 per cent by weight silver oxide, in the manner described in Example 1. The contact time was 0.14–0.2 second and the temperature was maintained at 220° C. The off-gases were condensed, and on distillation it was found that 72 per cent of the ether had undergone hydrolysis, and on this conversion basis, a 93 per cent yield of ethyl methyl ketone was obtained.

Operating in a manner similar to that illustrated in the above examples, other alkenyl alkyl ethers can be hydrolyzed to aldehydes or ketones. For example, hydrolysis of ethyl isobutenyl ether produces isobutyraldehyde and ethanol. Similarly, hydrolysis of methyl 1,2-dimethylpropenyl ether produces isopropyl methyl ketone and methanol.

It can be seen that the process of our invention is readily adaptable to continuous operation, the ether-steam mixture being continuously introduced and the aldehyde or ketone being withdrawn as formed. The process can be carried out at elevated or reduced pressures, if desired, e. g. at pressures as low as 5 p. s. i., or as high as 5000 p. s. i.

The aldehydes or ketones formed in our invention are useful as solvents, in the preparation of lacquers, etc. They can also be converted to acids by oxidation, alcohols by hydrogenation, and can be employed in the synthesis of other organic compounds.

What we claim as our invention and desire secured by Letters Patent of the United States is:

1. A process for hydrolyzing an ether selected from those represented by the following general formula:

$$R-O-C(R_1)=C(R_2)-R_3$$

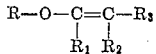

wherein R represents an alkyl group and $R_1$, $R_2$, and $R_3$ each represents a member selected from the group consisting of a hydrogen atom and an alkyl group comprising passing a mixture of the vapors of the said ether and steam over silver oxide deposited on a carrier, the silver oxide comprising from 5 to 30 per cent by weight of the total catalyst mass, at a temperature of from 150°–400° C.

2. A process for hydrolyzing an alkyl vinyl ether containing from 1 to 4 carbon atoms in the alkyl group comprising passing a mixture of vapors of the ether and steam over silver oxide deposited on a carrier, the silver oxide comprising from 5 to 30 per cent by weight of the total catalyst mass, at a temperature of from 150°–400° C.

3. A process for hydrolyzing ethyl vinyl ether to acetaldehyde and ethyl alcohol comprising passing a mixture of the vapors of ethyl vinyl ether and steam over silver oxide deposited on a carrier, the silver oxide comprising from 5 to 30 per cent by weight of the catalyst mass, at a temperature of from 150°–400° C.

4. A process for hydrolyzing ethyl vinyl ether to acetaldehyde and ethyl alcohol comprising passing a mixture of the vapors of ethyl vinyl ether and steam over silver oxide deposited on silica gel, the silver oxide comprising from 5 to 30 per cent by weight of the catalyst mass, at a temperature of from 150°–400° C.

5. A process for hydrolyzing an ether selected from those represented by the following general formula:

$$R-O-C(R_1)=CH_2$$

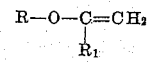

wherein R and $R_1$ each represents an alkyl group, comprising passing a mixture of vapors of the ether and steam over silver oxide deposited on a carrier, the silver oxide comprising from 5 to 30 per cent by weight of the catalyst mass, at a temperature of from 150°–400° C.

6. A process for hydrolyzing an ether selected from those represented by the following general formula:

$$R-O-C(R_1)=CH_2$$

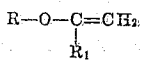

wherein R represents an alkyl group of the formula $C_nH_{2n+1}$ wherein $n$ represents a positive integer of from 1 to 4 and $R_1$ represents an alkyl group containing from 1 to 2 carbon atoms, comprising passing a mixture of the vapors of the ether and steam over silver oxide deposited on a carrier, the silver oxide comprising from 5 to 30 per cent by weight of the catalyst mass, at a temperature of from 150°–400° C.

7. A process for hydrolyzing an ether selected from those represented by the following general formula.

$$R-O-C(R_1)=CH_2$$

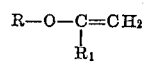

wherein R represents an alkyl group of the formula $C_nH_{2n+1}$ wherein $n$ represents a positive integer of from 1 to 4 and $R_1$ represents an alkyl group containing from 1 to 2 carbon atoms, comprising passing a mixture of the vapors of the ether and steam over silver oxide deposited on silica, the silver oxide comprising from 5 to 30 per cent by weight of the catalyst mass, at a temperature of from 150°–400° C.

8. A process for hydrolyzing ethyl isopropenyl ether to acetone and ethyl alcohol comprising passing a mixture of the vapors of ethyl isopropenyl ether and steam over silver oxide deposited on a carrier, the silver oxide comprising from 5 to 30 per cent by weight of the catalyst mass, at a temperature of from 150°–400° C.

9. A process for hydrolyzing ethyl isopropenyl ether to acetone and ethyl alcohol comprising passing a mixture of the vapors of ethyl isopropenyl ether and steam over silver oxide deposited on silica, the silver oxide comprising from 5 to 30 per cent by weight of the catalyst mass, at a temperature of from 150°–400° C.

10. A process for hydrolyzing ethyl 1-ethylvinyl ether to ethyl methyl ketone and ethyl alcohol comprising passing a mixture of the vapors of ethyl 1-ethylvinyl ether and steam over silver oxide deposited on a carrier, the silver oxide comprising from 5 to 30 per cent by weight of the catalyst mass, at a temperature of from 150°–400° C.

11. A process for hydrolyzing ethyl 1-ethylvinyl ether to ethyl methyl ketone and ethyl alcohol comprising passing a mixture of the vapors of ethyl 1-ethylvinyl ether and steam over silver oxide deposited on silica, the silver oxide comprising from 5 to 30 per cent by weight of the catalyst mass, at a temperature of from 150°–400° C.

12. A process for hydrolyzing an ether selected from those represented by the following general formula:

$$R-O-\underset{R_1}{C}=CH_2$$

wherein R represents an alkyl group of the formula $C_nH_{2n+1}$ wherein $n$ represents a positive integer of from 1 to 4 and $R_1$ represents an alkyl group containing from 1 to 2 carbon atoms, comprising passing a mixture of the vapors of the ether and steam over silver oxide deposited on alumina, the silver oxide comprising from 5 to 30 percent by weight of the catalyst mass, at a temperature of from 150°–400° C.

13. A process for hydrolyzing ethyl isopropenyl ether to acetone and ethyl alcohol comprising passing a mixture of the vapors of ethyl isopropenyl ether and steam over silver oxide deposited on alumina, the silver oxide comprising from 5 to 30 percent by weight of the catalyst mass, at a temperature of from 150°–400° C.

HUGH J. HAGEMEYER, Jr.
DAN C. ANDERSON.

References Cited in the file of this patent

UNITED STATES PATENTS

| Number | Name | Date |
|---|---|---|
| 2,075,100 | Dreyfus | Mar. 30, 1937 |
| 2,246,569 | Brown | June 24, 1941 |
| 2,424,085 | Bergsteinsson et al. | July 15, 1947 |
| 2,533,172 | McKinley | Dec. 5, 1950 |

OTHER REFERENCES

Cartmell et al., Ind. Eng. Chem., vol. 40, pages 389–392 (1948).